March 23, 1954 H. P. LUHN 2,673,032

DATA STORAGE, READ-OUT, AND COMPARISON DEVICE

Filed Oct. 6, 1951 9 Sheets-Sheet 1

INVENTOR
HANS P. LUHN
BY Robert S. Dunham
ATTORNEY

March 23, 1954 H. P. LUHN 2,673,032

DATA STORAGE, READ-OUT, AND COMPARISON DEVICE

Filed Oct. 6, 1951 9 Sheets-Sheet 2

INVENTOR
HANS P. LUHN
BY *Robert S. Dunham*
ATTORNEY

March 23, 1954 H. P. LUHN 2,673,032

DATA STORAGE, READ-OUT, AND COMPARISON DEVICE

Filed Oct. 6, 1951 9 Sheets-Sheet 3

INVENTOR
HANS P. LUHN
BY Robert S. Dunham
ATTORNEY

March 23, 1954 H. P. LUHN 2,673,032

DATA STORAGE, READ-OUT, AND COMPARISON DEVICE

Filed Oct. 6, 1951 9 Sheets-Sheet 4

INVENTOR
HANS P. LUHN
BY Robert S. Dunham
ATTORNEY

March 23, 1954 H. P. LUHN 2,673,032
DATA STORAGE, READ-OUT, AND COMPARISON DEVICE
Filed Oct. 6, 1951 9 Sheets-Sheet 5

INVENTOR
HANS P. LUHN
BY Robert S. Dunham
ATTORNEY

March 23, 1954 H. P. LUHN 2,673,032

DATA STORAGE, READ-OUT, AND COMPARISON DEVICE

Filed Oct. 6, 1951 9 Sheets-Sheet 6

INVENTOR
HANS P. LUHN
BY Robert S. Dunham
ATTORNEY

March 23, 1954 H. P. LUHN 2,673,032

DATA STORAGE, READ-OUT, AND COMPARISON DEVICE

Filed Oct. 6, 1951 9 Sheets-Sheet 7

INVENTOR
HANS P. LUHN
BY Robert S. Dunham
ATTORNEY

March 23, 1954 H. P. LUHN 2,673,032

DATA STORAGE, READ-OUT, AND COMPARISON DEVICE

Filed Oct. 6, 1951 9 Sheets-Sheet 8

INVENTOR
HANS P. LUHN
BY Robert S. Dunham
ATTORNEY

INVENTOR
HANS P. LUHN
BY Robert S. Dunham
ATTORNEY

Patented Mar. 23, 1954 2,673,032

UNITED STATES PATENT OFFICE 2,673,032

DATA STORAGE, READ-OUT, AND COMPARISON DEVICE

Hans P. Luhn, Armonk, N. Y., assignor to International Business Machines Corporation, New York, N. Y., a corporation of New York Application October 6, 1951, Serial No. 250,072

21 Claims. (Cl. 235—61.7)

This invention relates to a data storage device, and more particularly to a device into which data may be read from one or more record sources, and from which such stored data may be read for the control of a data reproducer, or for comparison of stored data.

In its broadest aspect the invention concerns itself with a data storage and read-out mechanism comprising a plurality of wires which are supported in spaced relation to each other. Adjacent the wires are a plurality of wire displacing devices mounted for movement over the wires for displacing selected wires from normal position to represent the stored data. After selected wires have been displaced, a wire sensing device is moved over the wires to detect displaced wires, whereby a data reproducer may be controlled in accordance with the sensed displaced wires, or a comparison of separate data represented by different displaced wires or groups thereof may be effected. Finally, the device includes provision for the restoration of displaced wires so that the mechanism may be used repeatedly as desired.

It is an object of the invention to provide a data storage device that may be controlled for the storage of data by a record source such as a perforated record card, and one in which data in the record source will be stored for subsequent use.

It is a further object of the invention to provide a data storage device in which data from different record sources may be stored and in which such data may be compared.

It is a further object of the invention to provide a data storage device in which data may be stored and from which such data may be read for the control of a data reproducer.

It is a further object of the invention to provide a data storage device in which displaced wires are representative of stored data values, and in which the displacement of such wires is under control of a plurality of data sources.

It is a further object of the invention to provide in a wire data storage device means for comparing data values stored therein from a plurality of different data sources.

Figure 1A:
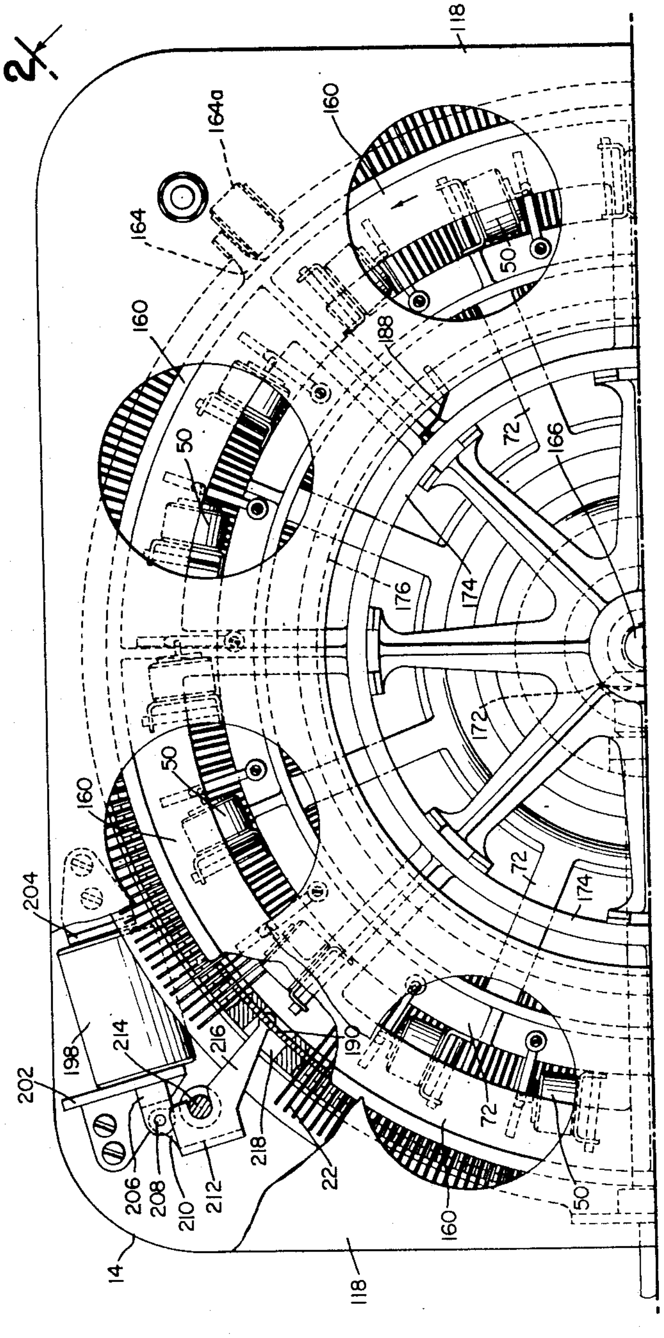
Figure 1B:
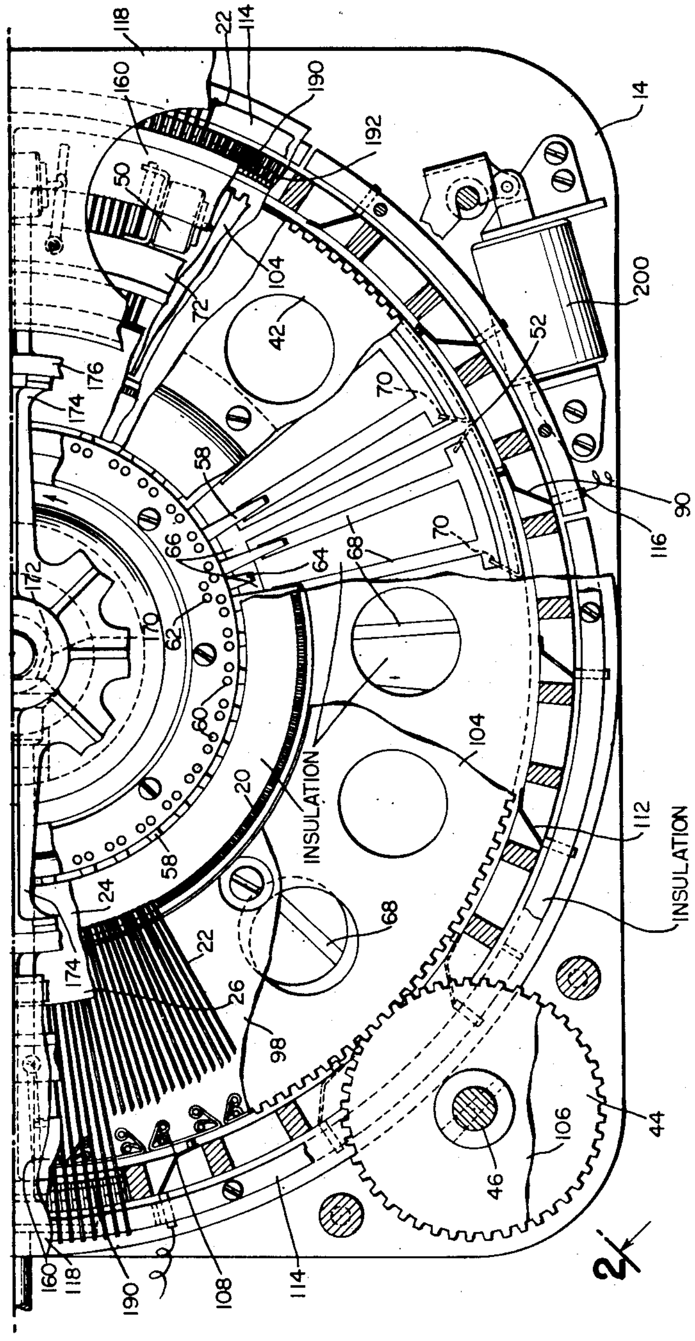
Figure 2:
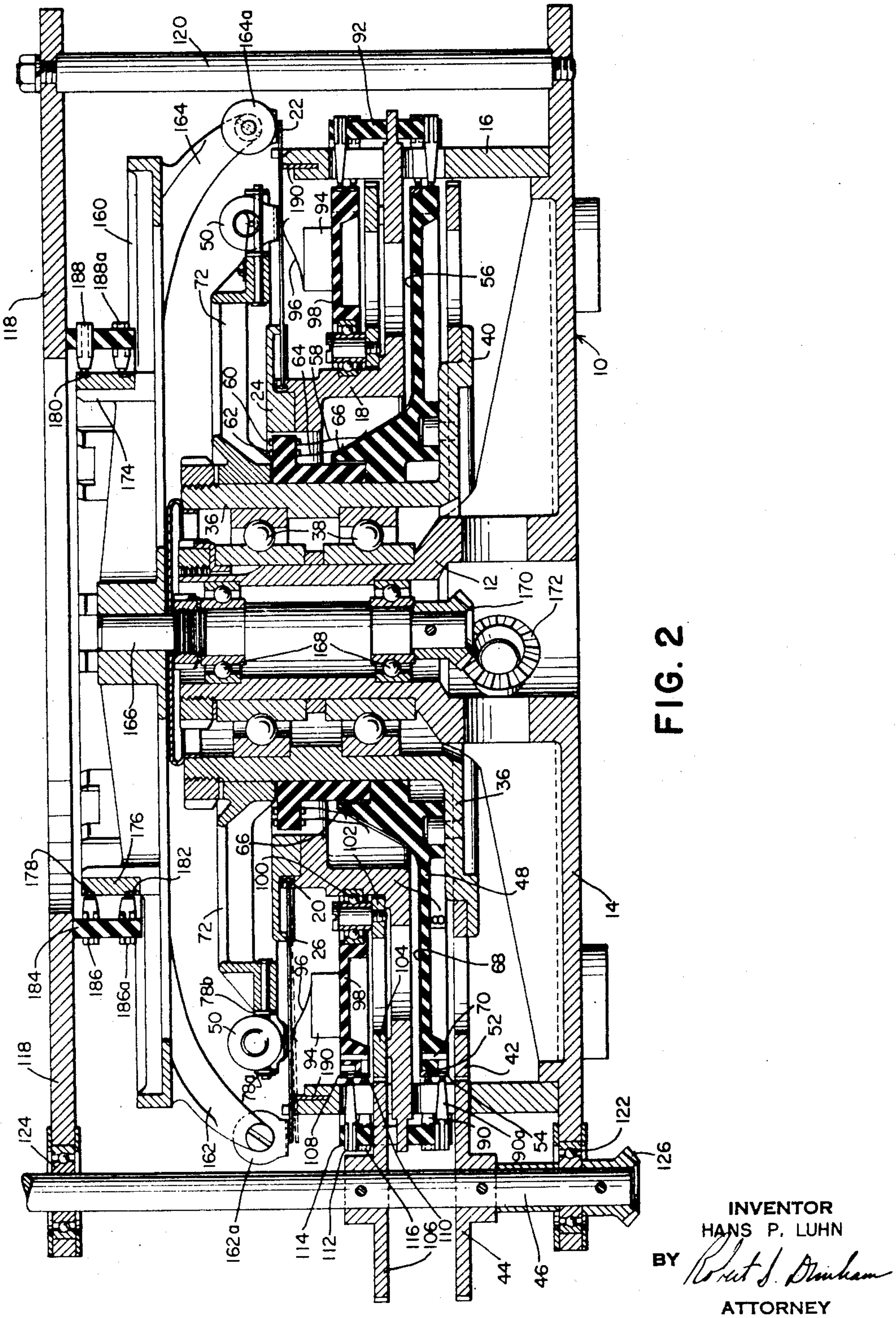
Figure 3A:
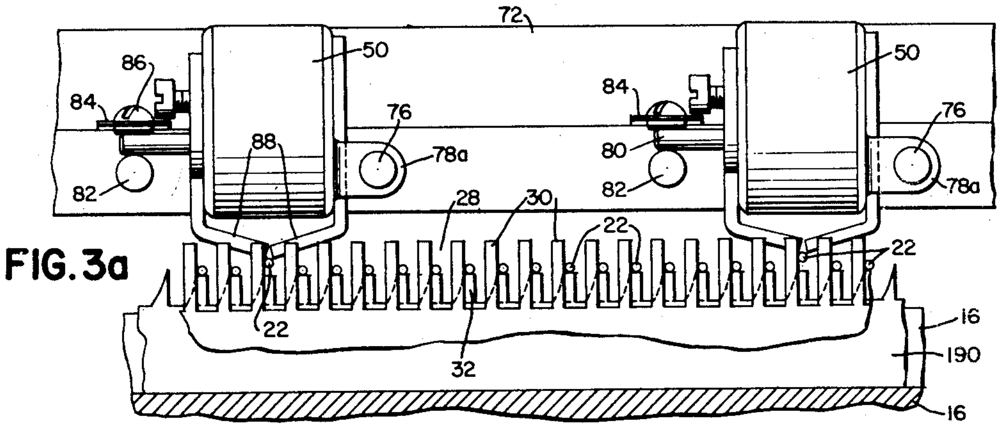
Figure 3B:
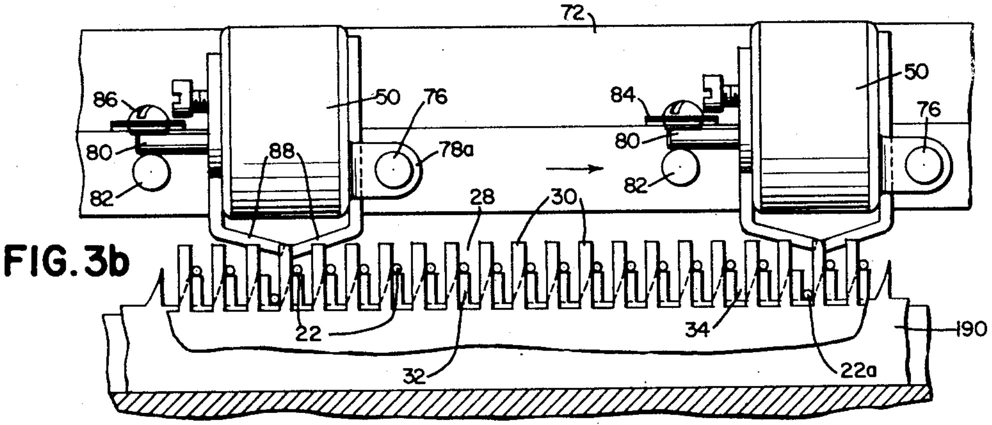
Figure 3C:
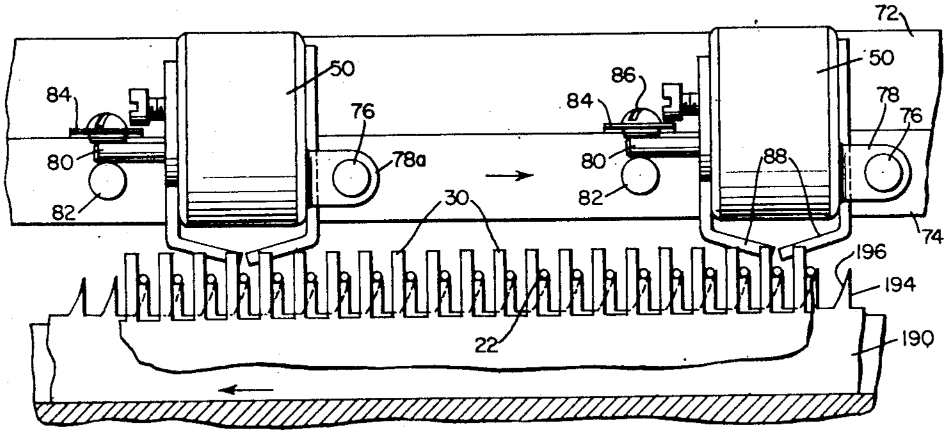
Figure 4:
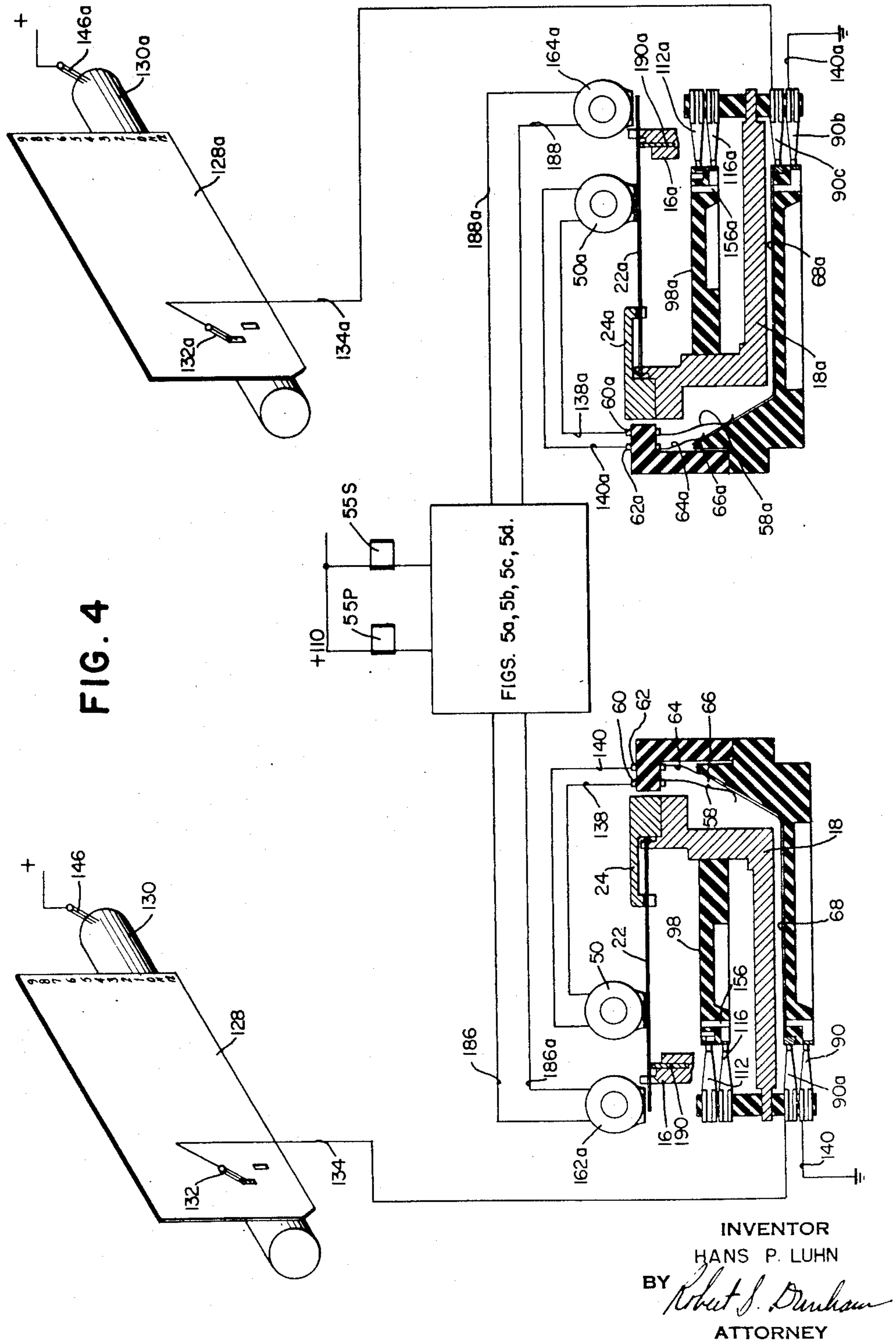

Other and further objects and advantages of the invention will appear or become evident as the description thereof is read in light of the drawings in which:

Figs. 1*a* and 1*b* taken together constitute a plan view of a data storage and sensing device forming the subject matter of this invention, parts having been broken away to show underlying structure;

Fig. 2 is a cross-sectional view on line 2—2 of Figs. 1*a* and 1*b*;

Figs. 3*a*, 3*b* and 3*c* are enlarged fragmentary views of data storage wire control mechanism in three different operative positions, the spacing and position of the several storage wires in relation to the wire displacing magnets being exaggerated for purpose of clarity;

Fig. 4 is a diagrammatic view of the data storage device according to the invention, showing in conjunction therewith data source sensing means, and in mere block form, a stored data comparing circuit; and Figs. 5*a*, 5*b*, 5*c* and 5*d*, when taken together, diagrammatically illustrate the data storage device in conjunction with details of a read-out and comparison circuit.

With particular reference to Fig. 2 of the drawing it will be seen that the wire storage device herein illustrated is supported on a base casting 10, the base casting having an upstanding throat or hub 12 and a base disc 14. The base disc 14 supports an annular wire guide casting 16 from which in turn is supported a wire support casting 18. The wire support casting 18 has an upstanding annular flange 20 which is slotted to receive one end of data storage wires 22. The wires 22 are held in proper position by a wire holding member 24 which is provided with a downturned flange 26 having therein slots through which the storage wires 22 pass outwardly in a radial direction. The wire holding member 24 serves to bias the the storage wires 22 downwardly with sufficient force to cause their downward displacement into a "set" position when released for displacement, as will be pointed out more fully hereinafter.

The storage wires 22 may vary as to number, but for the purpose of this illustration it may be assumed that 320 such storage wires have been provided, constituting twenty groups with sixteen wires in each group. In the illustrative embodiment herein shown, each group of wires may represent the column of a conventional perforated record card, and the first ten wires in each group may be representative of the card index points "0" through "9." The last six wires of each group may be employed to control functions or to provide necessary time for the performance of control functions. When twenty groups of wires are provided, a storage device for twenty card columns results. If, however, the storage device is to be used for the comparison of data read simultaneously from a pair of record cards, ten columns of one such card may be compared with ten columns of the other card. The storage and the comparison functions will be more fully described at a later point herein.

As best seen in Figs. 3*a* through 3*c*, the upper periphery of the wire guide casting 16 is slotted to provide a separate slot for each of the storage wires 22, thereby providing a comb-like structure with which the storage wires cooperate. Each slot 28 is defined by an upstanding tooth 30 which midway of its length has an abutment 32 against which the wires 22 normally rest. When the wires all rest upon their associated abutments 32, they are disposed thereby in a common plane. When a wire is "set" to represent a value, it is displaced laterally in respect to the abutment 32 and springs to the deepest part of the slot 34 as illustrated by the wire **22*a*** in Fig. 3*b*. The manner in which the wires are selectively displaced into "set" position and the manner in which they are restored to normal position on the abutments 32 will be pointed out in greater particularity as the description of the device proceeds.

Mounted for rotation on the base casting hub 12 is a read-in hub 36. The read-in hub is supported for rotation on the base casting hub 12 by means of a pair of ball bearing assemblies 38. To a laterally extending flange 40 of the read-in hub 38 is affixed a drive gear 42. This gear has peripheral teeth meshing with the teeth of a gear 44 carried for rotation with a drive shaft 46.

Fixed for rotation with the read-in hub 36 is a read-in commutator 48. The read-in commutator 48 is formed of suitable insulating material and supports the several conducting elements by which electrical impulses originating from a perforated record card reading device, for example, are transmitted to a wire setting device which is shown herein as a magnet 50. The peripheral surface of the read-in commutator 48 has provided thereon twenty commutator segments 52, which are mutually insulated from each other and which correspond to the twenty groups of storage wires. Immediately below the segments 52, and insulated therefrom is a common commutator strip 54. Impulses passing into the segments 52 are conducted from the segments through a conducting strip 56, through a spring connector 58 and to a plug hub 60 which is adapted to receive a lead from one of the wire setting magnets 50. The opposite end of the magnet 50 is connected to a plug hub 62 which is in electrical contact with a return spring connector 64, the latter bearing on an annulus 66 constituting the common return. The annulus 66 has a return strip 68 connected to the commutator common 54 by means of a connecting stud 70.

The read-in hub structure 36 has mounted thereon, for rotation with the hub, a wire setting magnet support casting 72 at the outer periphery of which are carried the wire setting magnets 50. Since there have been provided twenty groups of storage wires, there are also twenty wire setting magnets 50, one such magnet being operative over a given group of wires at any point of the read-in cycle. Figs. 3*a* through 3*c* will best illustrate the manner in which the magnets 50 are supported. The wire setting magnet support casting 72 has a laterally extending flange 74 in which are mounted studs 76 constituting pivotal mountings for the magnets 50. The magnets each have a supporting bracket 78 providing a pair of spaced ears **78*a* and 78*b* apertured to pass onto the stud 76. The opposite side of each magnet has a stop pin 80 extending laterally therefrom to engage a wire setting magnet support casting pin 82. The pin 82 limits downward rocking movement of the magnet 50 about its mounting stud 76. A spring arm 84 having an adjusting screw 86 serves to position the magnet so that an armature 88 may be adjusted in respect to the storage wires 22. In this regard it may be noted that the magnets 50** move over the wires in very light contact therewith, such contact being insufficient of itself to disturb the normal position of the wires.

It will be apparent from the mechanism thus far described that the magnets 50 may be passed over the storage wires 22 by rotating the read-in hub 36 through power applied to the drive shaft 46. If, while passing over the storage wires 22, one or more of the magnets 50 are energized, as by the reading of a perforation in a punched record card, such energized magnets will attract the storage wire 22 over which the magnet or magnets are positioned at the time such magnets are energized. The attraction of the magnet pole pieces 88 for the storage wire 22 is sufficient to drag the attracted storage wire with the magnet as it moves over the storage wires. Such drag will displace an attracted storage wire from the abutment 32, whereupon the spring bias of a displaced wire 22 is sufficient to cause it to snap down into the deepest part 34 of the slot 28.

In order to selectively energize the magnets, there is provided herein a plurality of read-in brushes 90 which are mounted in an annulus 92 formed of insulating material and supported in fixed position by the wire support casting 18. In Fig. 1*b* a read-in brush 90 is shown provided for each commutator segment 52. It may be noted at this point that the commutator segment 52, in fact, comprises a pair of segments that are shunted together. This arrangement provides an electrical impulse path by which the magnets 50 may be energized.

The present invention is designed for the dual function of data read-out for the control of a recording instrumentality such as a punch or a printer and for the comparison of data stored in the device from two separate data sources. The read-out function will be described first, and the comparison function will be described later. For the sensing of displaced wires, there has been provided herein a read-out commutator on which is mounted a plurality of read-out devices, shown herein as a plurality of micro-switch structures corresponding in number to the wire setting magnets 50. A micro-switch 94 has an actuating arm 96 which is adapted for contact with a downwardly displaced storage wire 22. When such contact takes place, the micro-switch 94 is closed to establish a read-out circuit. A read-out commutator 98 is mounted on the wire support casting 18 by means of anti-friction bearings 100. Attached to the read-out commutator 98 is a gear 102 having peripheral teeth 104 that engage the teeth of a drive gear 106. The gear 106 is mounted on the drive shaft 46 for rotation therewith. In the arrangement herein shown, the micro-switch 94 is mounted to follow its associated wire setting magnet 50 so that a storage wire 22 displaced downwardly by the magnet 50 lies in the path of the operating arm 96 of the micro-switch to close the switch when the arm comes into contact with a displaced wire and thereby close the read-out circuit. Each of the micro-switches 94 is connected to an individual commutator segment 108 and to a common commutator strip 110.

Read-out brushes 112 are mounted in a read-out brush ring 114 supported by the wire guide casting 16. The read-out brush ring 114 also has mounted therein a brush 116 which is in contact with the common commutator strip 110.

A head plate 118 is connected with the base casting 10 by means of a plurality of tie rods 120. The drive shaft 46 is journalled for rotation in the base casting 10 and in the head plate 118 by means of roller bearings 122 and 124, there being a bevel gear 126 at the end of the drive shaft 46 through which driving connection may be made with a suitable source of power.

Figure 5A:
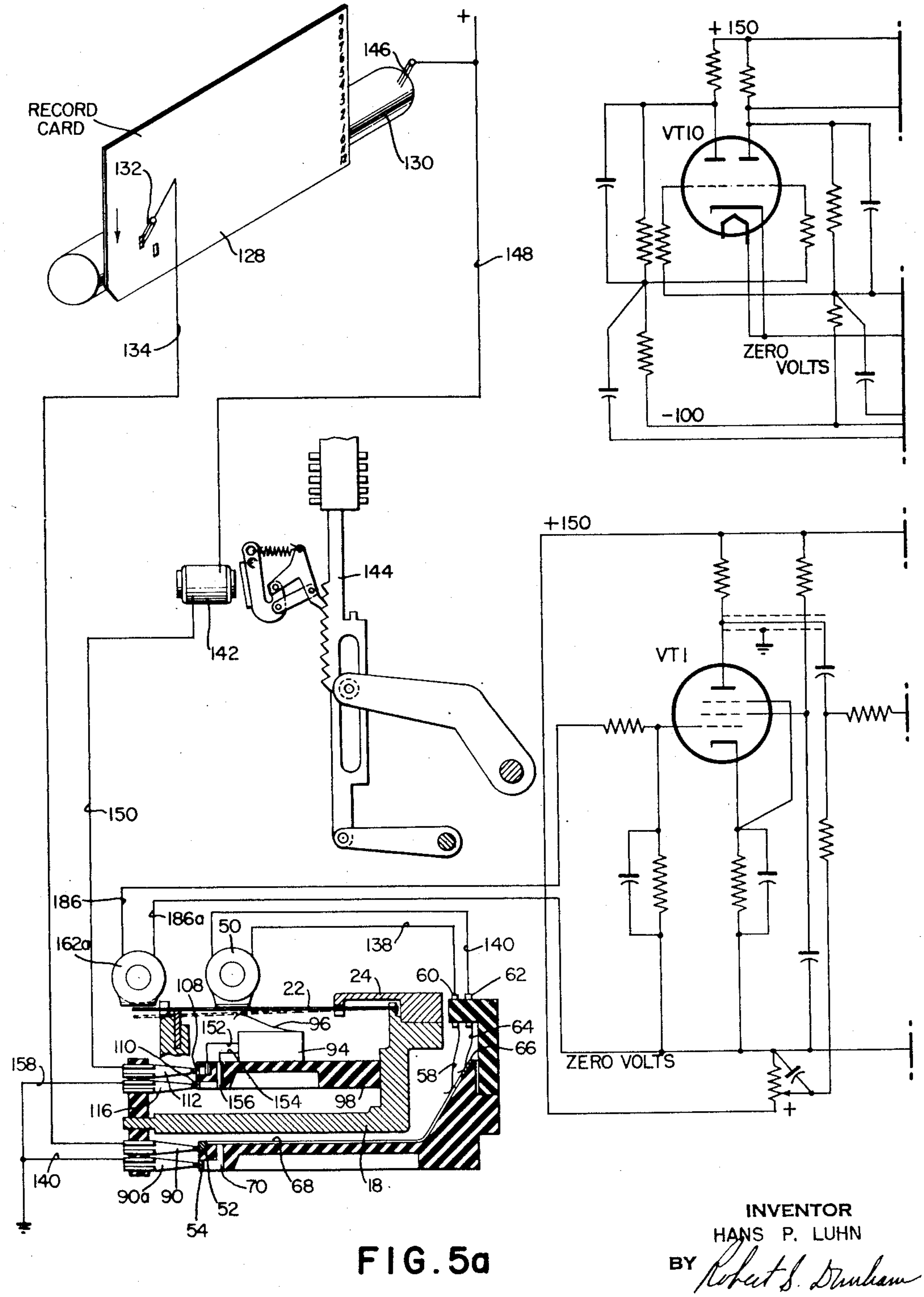
Figure 5B:
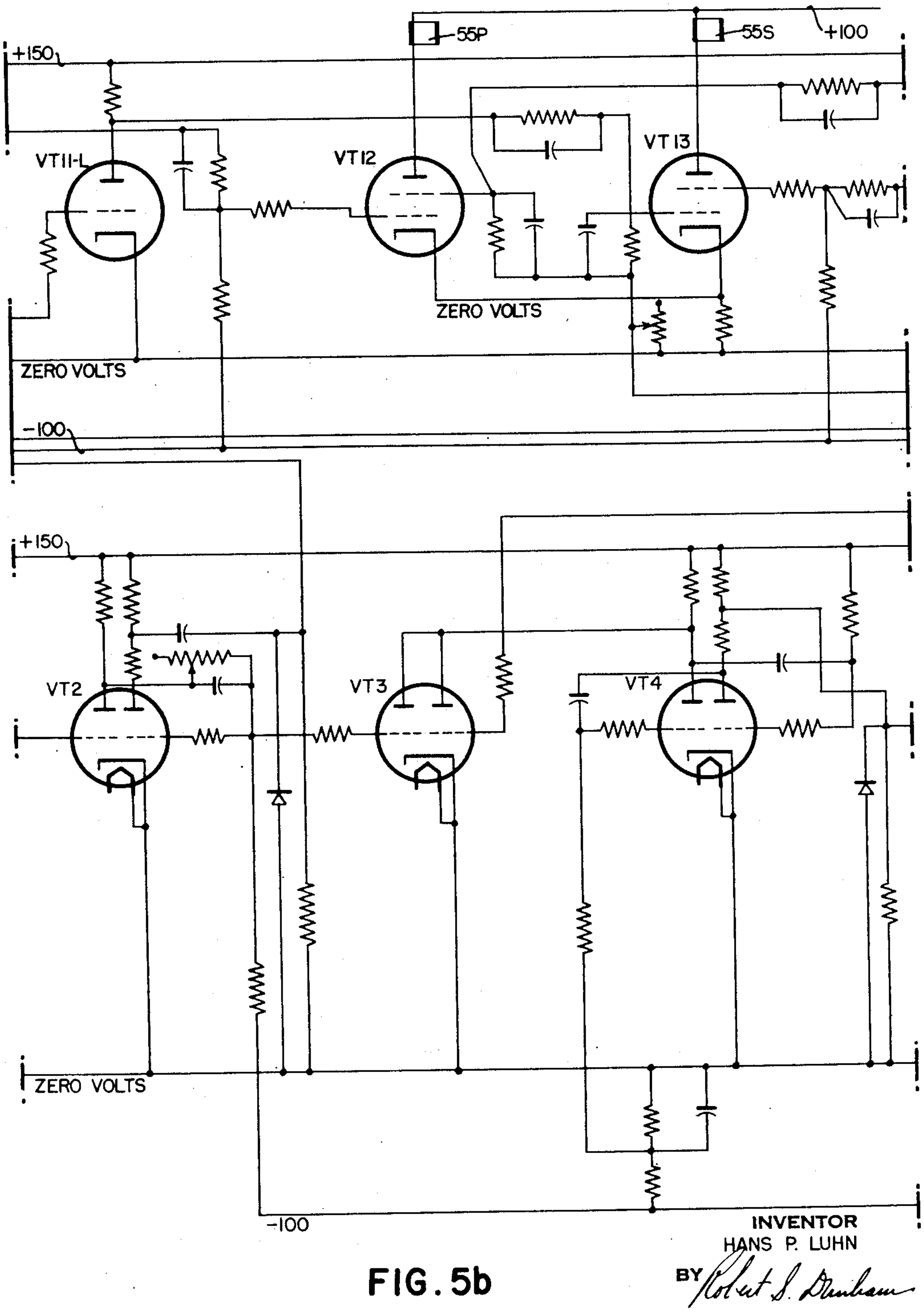
Figure 5C:
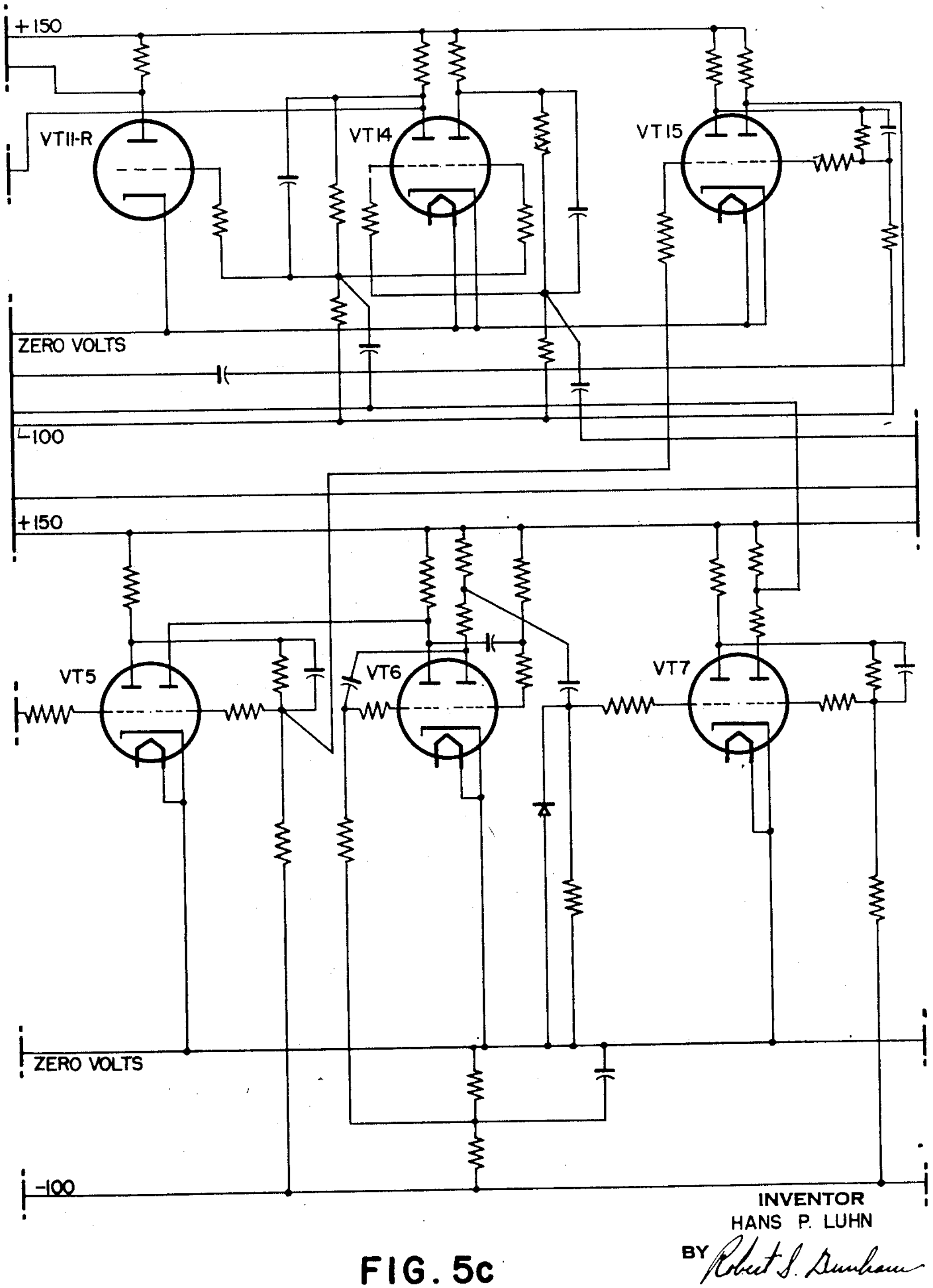
Figure 5D:
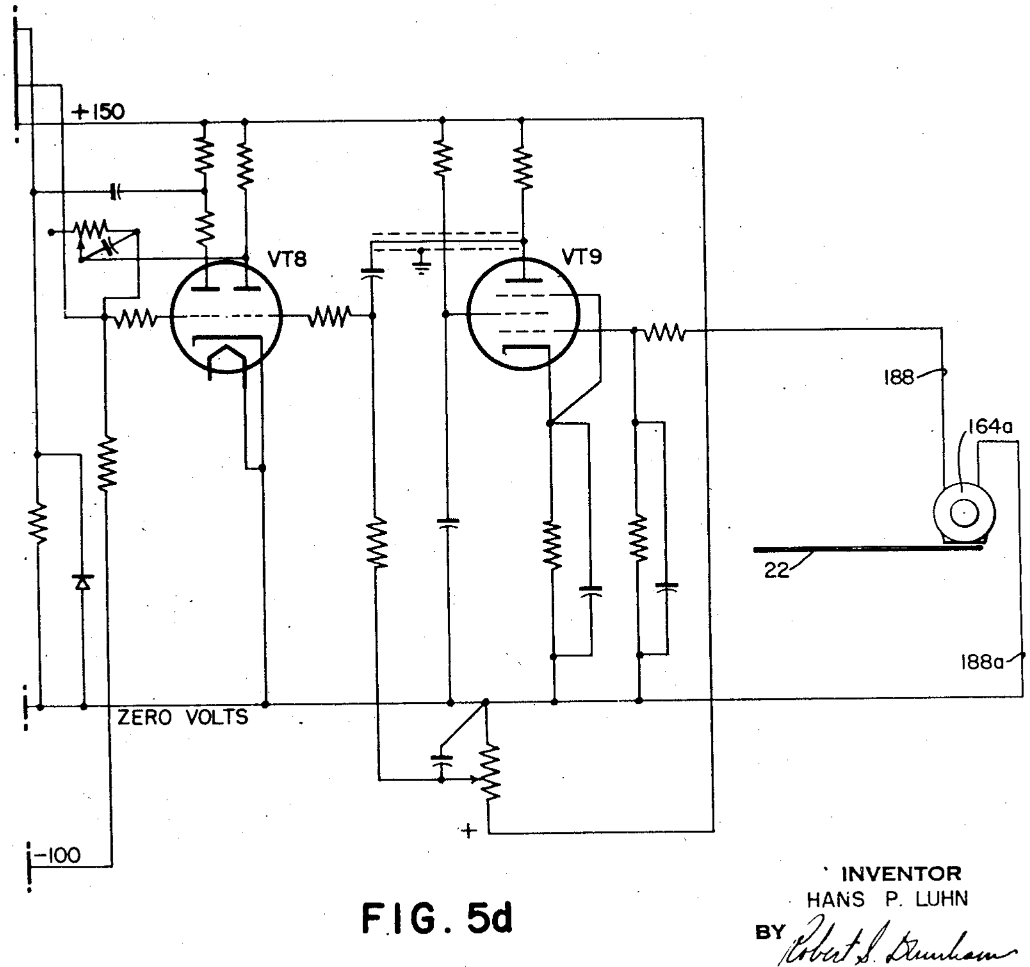

The mechanism thus far described is sufficient for the storage of data and for the read-out of such stored data. By reference to Fig. 5a it will be noted that this figure illustrates the sensing of a perforated record card by means of which the wire setting magnets 50 may be energized for displacing a wire into "stored" position, and that in connection with the storage wires there is a micro-switch associated with the setting magnet shown in that figure for closing a circuit to energize the magnet of a conventional type bar control assembly, whereby the value stored in the device may be read out and printed. In Fig. 5a of the drawings a conventional perforated record card 128 is being sensed in a card reading device, which includes an energized reading roll 130 and a plurality of reading brushes 132, there being a reading brush 132 for each card column. Suitable mechanism, well known in the art, is employed for feeding the record card 128 in contact with the energized reading roll 130 and under the reading brushes 132. In such devices a reading brush 132 is provided for each card column it is desired to read. In the illustrative embodiment of the invention herein illustrated, twenty such brushes for the reading of twenty card columns may be provided. As the perforated record card 128 is fed under the brushes 132, one index point to the next, the wire setting magnets 50 are rotated in synchronism over the storage wires 22. Thus, when the index point of the card corresponding to the digit "1," for example, is under the reading brushes 132, the wire setting magnets 50 will be over the storage wire representative of the digit "1" in the respective groups. With this in mind, it is easy to see that the several wires of each group may be displaced to represent values sensed by the record card reading device. Specifically, as a card is being sensed under the brushes 132, a brush 132 will encounter a perforation in the record card and make contact with the energized reading roll 130. Thereby, a circuit is completed from the reading roll 130, through the reading brush 132, through a connector 134 to the read-in brush 90, to the commutator segment 52, the conductor strip 56, the spring connector 58, plug socket 60, connector 138, setting magnet 50, through the connector 140, plug socket 62, spring connector 64, common ring 66, return strip 68, connecting stud 70, common commutator strip 54, common brush 90a and ground connection 140. When this circuit is closed, the magnet 50 therein will be energized and its poles 88 will attract the wire 22 over which the pole pieces 88 are disposed at the time of energization. The wire 22 so attracted will be displaced from its tooth abutment 32 and will spring into displaced position at the deepest part 34 of the slot 28. It is understood, of course, that each of the wire setting magnets 50 is similarly connected to a different one of the reading brushes 132, so that a storage wire 22 in each of a plurality of storage wire groups may be displaced for representation of data found in each of a corresponding plurality of card columns of the perforated record card 128.

Data stored in the device by the displacement of storage wires 22 may now be read out of the device for the control of some instrumentality such as a printing bar as shown in Fig. 5a. The gears 44 and 106 drive the read-in hub drive gear 42, and the read-out gear 102, respectively in synchronism so that the micro-switches 94 sweep their respective storage wire groups to sense displaced wires in such groups. Herein each micro-switch 94 is electrically connected with a print bar control magnet 142. The magnet 142 is adapted to control the movement of a print bar 144, the operation of the print bar 144 being conventional and such as that shown in U. S. Patent No. 1,976,617, issued October 9, 1934, to C. D. Lake et al.

As the read-out commutator 98 is rotated, the operating arm 96 of the micro-switch 94 will contact a downwardly displaced storage wire 22 to close the circuit through which the print bar control magnet 142 is controlled. This circuit may be traced from the energized reading roll 130, through a common brush 146, a connection 148 between the common reading brush 146 and the print bar control magnet 142. The circuit continues from the print bar control magnet 142 through a connection 150 to the read-out brush 112, through the read-out segment 108, through a connection 152 to one side of the micro-switch 94. The other side of the micro-switch 94 is connected through a connector 154, through a pin 156, to the common commutator strip 110. From thence the impulse is carried through the read-out common brush 116 to a ground connection 158.

As stated hereinbefore the mechanism is adapted for the simultaneous storage of data from two different sources such as, for example, a pair of perforated record cards. According to this latter concept the data from one card may be stored in one-half the storage wires as, for example, in those of Fig. 1a, while the data from the second card may be stored in the remaining storage wires as, for example, those shown in Fig. 1b. When the device is used for storage from two sources, data from ten columns of each source may be handled in the mechanism illustrated herein. As an alternative, certain storage wires of one-half or less of the device may be set to represent a value which may remain the same through successive comparison cycles as when a plurality of perforated record cards are read successively, and varying data thereon is to be compared to the set-up standard. It will be shown that the circuit by which the comparison is accomplished will indicate whether the stored data compared with the stored standard of comparison is greater than, less than, or equal to the stored standard of comparison. Fig. 4 of the drawings is a diagrammatic illustration of a pair of record card reading stations adapted to read perforated record cards and store the data found therein in diametrically opposite storage wire groups of the storage device herein. The system of Fig. 4 merely represents a duplication of the read-in circuits of Fig. 5a and the manner in which storage wires according to the arrangement of Fig.

4 are displaced into "set" position is precisely the same.

In order to sense the displaced wires according to the comparison system of Fig. 4, the device has rotatably mounted therein a comparing spider 160. The comparing spider 160 has a pair of diametrically opposed comparing device support arms 162 and 164. These arms support a pair of variable reluctance pick-up heads 162*a* and 164*a* which are shown herein as having pole pieces arranged in close proximity to the storage wires 22. Since the electromotive force generated by the passage of displaced wires through the field of the pick-up heads 162*a* and 164*a* will be different than that produced by the storage wires 22 that are in normal position, an impulse is generated which is sufficient to energize a comparing circuit to be described more fully hereinafter.

The comparing spider 160 is mounted at one end of a shaft 166 that extends through the base casting hub 12. The shaft 166 is mounted in the base casting hub for rotation therein by means of a pair of anti-friction bearings 168. The opposite end of the shaft 166 has attached thereto a bevel gear 170 which is in operative contact with a bevel gear 172 on the end of a shaft to which power is applied for rotating the comparing spider 160. At this point it may be noted that the comparing spider 160 is preferably driven at a greater angular speed than the wire setting magnet support casting 72. This is dictated by the fact that the wire setting magnets 50 need traverse only ten wires to effect a complete storage of record card data, whereas the comparing spider 160 must rotate at such speed that the pick-up heads 162*a* and 164*a* traverse ten storage wire groups while the setting magnets 50 are traversing a single group of storage wires or a minimum of ten wires of such groups.

The comparing spider 160 has a collar 174 on which is mounted a commutator base 176 formed of insulating material. Carried by the face of the base 174 are a pair of mutually insulated commutator strips 178 and 180, each of these strips extending half-way around the circumference of the commutator base 176. A common commutator strip 182 extends about the base 176 in proximity to the commutator strips 178 and 180.

The pick-up head 162*a* is electrically connected to the commutator segment 178 and to the common commutator strip 182, whereas the pick-up head 164*a* is electrically connected to the commutator segment 180 and the common commutator strip 182.

Impulses created by set storage wires over which the comparing spider 160 carries its pick-up heads 162*a* and 164*a* are taken from the commutator segments 178 and 180, respectively, by means of brushes that are mounted in an insulating ring 184 supported by and depending from the head plate 118. These brushes are indicated in Fig. 2 of the drawings by the reference numerals 186 and 186*a* insofar as the pick-up head 162*a* is concerned, and by the reference numerals 188 and 188*a* insofar as the pick-up head 164*a* is concerned. The pick-up head 162*a* and the pick-up brushes 186 and 186*a* may be located in Fig. 5*a* of the drawings, while the pick-up head 164*a* and the brushes 188 and 188*a* may be located in Fig. 5*d* of the drawings. Figs. 5*a* through 5*d* of the drawings show the relation of the pick-up heads 162*a* and 164*a* to the comparing circuit which may now be described.

As noted above, data for comparison may be stored in the device from separate sources, as for example from a pair of perforated record cards as diagrammatically illustrated in Fig. 4 of the drawings. In this figure of the drawings the parts at the left thereof constitute the storage and comparison read-out mechanism of Fig. 5*a*, while the parts at the right thereof are in effect a duplication of the mechanism shown at the left and consequently the same reference numerals with the suffix *a* will be applied to corresponding parts.

Let it be assumed that data from the card 128 is read into the storage device and that wires in one-half of the device are displaced to correspond to card perforations. At the same time perforations appearing in record card 128*a* will be sensed at the second reading station comprising energized reading roll 130*a* and brushes 132*a*. Perforations sensed in record card 128*a* will result in the displacement of corresponding wires in the opposite half of the wire assembly. As the pick-up heads 162*a* and 164*a* are rotated to sense displaced wires, electrical impulses will be generated by the variation in the air gap between the pick-up heads and the wires, and these impulses are fed into the comparing circuit of Figs. 5*a*–5*d* (indicated only diagrammatically in Fig. 4).

The comparison circuit includes a pair of pentodes VT1 and VT9 constituting primary and secondary pulse amplifiers respectively; a pair of dual triodes VT2 and VT8 constituting primary and secondary pulse shapers respectively; dual triodes VT3, VT4, VT6 and VT7 operating as test pulse drivers, test pulse delay, test pulse reset delay and reset pulse shapers respectively; test pulse shaping dual triodes VT5 and VT15; a pair of dual triode triggers VT10 and VT14 effected by the primary and secondary impulses respectively; a pair of triodes VT11–L and VT11–R constituting balance switches; and a pair of tentrodes VT12 and VT13 being output tubes in circuit with relays 55P and 55S respectively, by which primary and secondary impulses may be utilized in any desired manner. Such utilization may be for the purpose of signalling the result of the comparison or for control of further record or record card processing devices such as a collator as shown in Patent No. 2,359,670, issued October 3, 1944, to Ralph E. Page.

The primary and secondary pick-up heads 162*a* and 164*a* are of the variable reluctance type, as noted, whereby read-out for comparison purposes is accomplished when the pick-up heads sense a variation in the air gap between storage wires 22 that have been displaced and those that have not been displaced. As pointed out hereinabove, when a hole in a card is sensed by one of the reading brushes, the wire setting magnet 50 for the particular column in which the hole is sensed is energized causing a storage wire 22 corresponding to a hole to be displaced. When no holes are sensed, the wires remain in their normal position, maintaining the air gap between the wires and the pick-up heads 162*a* and 164*a* at such magnitude that a positive signal is emitted by the pick-up heads as they pass over the storage wires.

Since no claim is made to the specific comparison circuit herein, it will be sufficient for the purpose of this description to describe its function more or less generally.

To explain the operation of the comparison circuits, let it be assumed that a signal is emitted by the primary pick-up head 162*a* and that due to a displaced wire in the position with which comparison is being made, the secondary head 164a does not emit an impulse. The signal from the primary pick-up head 162a is fed to the grid of the primary pulse amplifier VT1, the plate of which will swing negative. This negative impulse is applied to the left grid of the primary pulse shaper VT2. The left side of the pulse shaper VT2 is normally in a conducting state, and this negative pulse drives the left grid to cut-off with a resulting positive voltage on the plate associated therewith. The right half of the primary pulse shaper VT2 is held at cut-off by virtue of the bias on its grid. When the positive pulse from the left plate of the pulse shaper VT2 is applied to the right grid, the right half of the tube is triggered to conduct and the resulting negative pulse from the right plate is used as a trigger pulse for a primary trigger VT10. In its normal state the right side of the primary trigger VT10 is conducting, while the left side is held at cut-off. When the trigger pulse from the right side of the primary pulse shaper VT2 is applied to the right grid of the primary trigger VT10, the right side of the trigger is driven to cut-off. A positive voltage from the right plate will flip the left side of the primary trigger VT10 to a conducting state and will also trigger the grid of a balance switch VT11-L and the control grid of an output tube VT12. The balance switch VT11-L will now be in a conducting state causing its plate to swing in a negative direction. This negative swing will tend to drive the screen grid of a secondary output tube VT13 even more negative so that the tube will not conduct when the test pulse is sent through.

At the same time that a pulse was emitted from the primary pick-up head 162a, the absence of a pulse was detected at the secondary pick-up head 164a. With no signal impulse going into the secondary pulse amplifier VT9, the result will be the absence of signals through the secondary side of the circuit. The secondary trigger VT14 will remain in its normal condition such that the control grid of the secondary output tube VT13 will be held negative while the screen grid of the primary output tube VT12 will be held at such level that the test pulse will fire the tube. Both sides of the comparison circuit are, therefore, conditioned, and when the test pulse arrives an indication will be given as to whether a high, low or equal condition exists among the wires compared by the pick-up heads 162a and 164a.

The same negative pulse from the left plate of the primary pulse shaper VT2 that resulted in the negative trigger pulse previously explained is also used to fire a test pulse driver VT3. The plate of the test pulse driver will swing negative, pulsing the grid of the test delay tube VT4. The right plate of the test delay tube VT4 will swing positive to fire the left side of the tube and thereby render its plate negative. This arrangement of the circuit will result in test delay corresponding to the time constants used.

A positive pulse emitted from the right plate of the test delay tube VT4 is differentiated and fed as a negative pulse to the left control grid of a test pulse shaper VT5. The resulting positive pulse on the left plate of the test pulse shaper VT5 is fed to the left grid of test pulse shaper VT15 and to the right grid of the test pulse shaper VT5. The circuit feeding the grid of test pulse shaper VT15 will be followed first.

The right side of test pulse shaper VT15 is normally conducting. When a positive voltage is applied to the left control grid, its plate will swing negative to cut off the normally conducting right side of the tube. From the right plate of test pulse shaper VT15 is obtained a positive pulse which is applied to the screen grid of the primary and secondary output tubes VT12 and VT13. The primary output tube VT12 has a positive voltage already applied to its control grid so that when the test pulse from the test pulse shaper VT15 raises its screen, the tube will conduct aand energize a relay 55P in its plate circuit. The secondary output tube VT13 has not been conditioned in this way as no pulse was received from the secondary pick-up head 164a through the secondary side of the circuit. Therefore, the secondary output tube VT13 will not fire and the relay 55S in its plate circuit will not be energized.

The circuit feeding the right side of the test pulse shaper VT5 from which the reset pulse is derived will now be explained. The right grid of test pulse shaper VT5 will be driven positive by virtue of the positive swing of the left plate of test shaper VT5. The right side of test pulse shaper VT5 will then conduct, emitting a negative pulse from its plate which will be applied to the right grid of a drive pulse reset delay tube VT6. A similar circuit as used for test delay is employed here and the positive pulse from the right plate of reset delay tube VT6 is differentiated to apply a negative pulse to the left grid of a reset pulse shaper VT7. The left plate of the reset shaper VT7 will go positive causing the right grid to follow and ionize that portion of the tube. The right plate of the reset shaper VT7 will now swing negative, and this negative trigger reset pulse will be fed to both the primary trigger VT10 and the secondary trigger VT14 to provide for reset. The pulse on the left grid of the primary trigger VT10 will flip that trigger back to normal, while the pulse fed to the secondary trigger VT14 will have no effect as the secondary trigger had not received a pulse to upset its original stable condition.

During that portion of the comparing cycle wherein both the primary pick-up head 162a and 164a emit pulses simultaneously, neither the primary relay 55P nor the secondary relay 55S will be effected, since neither the primary output tube VT12 nor the secondary tube VT13 will conduct because their screen grids are held negative. This condition indicates that the wires being sensed by the pick-up heads are of the same value. The same is true if no impulse is emitted by either pick-up head by virtue of the simultaneous sensing of a displaced wire, except, of course, that in this case the control grid of the output tubes VT12 and VT13 will be held at cut-off.

Herein the primary example has involved the emission of a pulse from the primary pick-up head 162a during the absence of a pulse from the secondary pick-up head 164a. The result is reversed if conditions are reversed, i. e. if the secondary pick-up 164a emits a pulse while the primary pick-up head 162a fails to emit a pulse because of displacement of a wire being sensed, the relay 55S will be energized by flow of pulses through the circuit in a reverse direction.

In devices of this kind it is necessary to provide for the resetting of the storage wires at the end of each read-out cycle or as may be desired otherwise. Figs. 1a, 1b and 3a through 3c illustrate the storage wire restoring mechanism. The wire guide casting 16 is circumferentially slotted inwardly from its upper edge to receive therein a pair of semi-circular restoring bails 190 and 192. The restoring bails 190 and 192 have wire restoring teeth 194 cut into the upper edge thereof. These teeth correspond in number to the slots 28 in the wire guide casting, and each has an inclined face 196 having its base at the base 34 of its related slot 28. The teeth 194 extend upwardly to a point slightly above the abutments 32. In effect, the inclined face 196 serves as a camming surface by means of which displaced wires such as the wire 22*a* in Fig. 3*b* are restored to their normal positions on the abutments 32 whenever the restoring bails 190 and 192 are roated relative to the guide wire casting 16 in which they are mounted.

Electromechanical mechanism has been provided for oscillating the restoring bails 190 and 192 through a wire restoring stroke. A solenoid 198 (Fig. 1*a*) is provided for operating the restoring bail 190. A solenoid 200 (Fig. 1*b*) is provided for operating the restoring bail 192. The solenoids and their associated mechanisms are identical, and a description of solenoid 198 will suffice as a description of both. The solenoid 198 is mounted on the base casting 10 by means of mounting brackets 202 and 204. The solenoid core 206 is attached by means of a pivot pin 208 to a laterally extending ear 210 of a bracket 212 which is pivoted on a stud 214 and has a laterally projecting finger 216 adapted to engage a circumferential slot in the restoring bail 190. The laterally projecting finger 216 extends through an aperture 218 formed in the wire guide casting 16. When the solenoid 198 is energized, its core 206 will be pulled inwardly, thereby rocking the bracket 212 about its pivot stud 214, thus actuating the finger 216 in a counterclockwise direction as viewed in Fig. 1*a*. This will serve to pull the inclined faces 196 of the wire restoring teeth 194 in the direction of their related abutments 32, thereby camming any displaced wire 22 to its normal position. Deenergization of the solenoid 198 will release its core 206 and permit the restoring bail 190 to return to its normal or inoperative position.

The solenoids 198 and 200 may be energized in any suitable way. For the simultaneous successive storage and comparison of diverse data or for the mere cyclic read-out of stored data, these solenoids may be energized by suitable cyclically closed contacts, or manual control switches may be employed as when data is stored for repeated read-out.

Figs. 3*a* through 3*c* illustrate the manner in which wires are displaced into data representing position, and how such displaced wires are again restored to normal position. In Fig. 3*a* is shown a plurality of storage wires 22 constituting a part of two storage groups. As represented in this figure, magnets 50 have been simultaneously energized, a condition prevailing upon the reading of the same perforated index point of adjacent card columns for example. The pole pieces 88 have attracted the storage wires 22 at the gap between the pole pieces. As the wire setting magnet support casting 72 continues to rotate in respect to the fixed wire guide casting 16, the wires attracted to the magnet pole pieces will be carried with the magnets, the wires being sufficiently flexible to permit such limited movement. By the time the magnets have moved to the right as shown in Fig. 3*b*, they will be deenergized, and the wires influenced thereby will be released from the magnetic influence and drop into the lowest position 34 of the related wire guide slot. Fig. 3*c* shows the position of the parts wherein the wire restoring bail 190 has been moved to the left as viewed in that figure upon energization of its operating solenoid 198. It will be observed herein that the inclined face 196 of the wire restoring teeth 194 have cammed the displaced wires of Fig. 3*b* into their normal position on their abutments 32.

While there has been shown and described and pointed out the fundamental novel features of the invention as applied to an embodiment thereof, it will be understood that various omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. A data storage and read-out mechanism comprising, a plurality of wires, means for supporting said wires in spaced relation to each other and in a single common plane, electromagnetic means mounted for movement over said wires, means responsive to a data source for energizing said electromagnetic means to condition the same to magnetically displace selected wires from normal position, means mounted for movement over said wires for detecting displaced wires, and means operative for restoring displaced wires to normal position.

2. A data storage and read-out mechanism comprising, a plurality of wires, means for supporting said wires in spaced relation to each other and in a single common plane, electromagnetic means mounted for movement over said wires, means responsive to a data source for energizing said electromagnetic means to condition the same to magnetically displace selected wires from normal position, electromagnetic means mounted for movement over said wires for detecting displaced wires, and means operative for restoring displaced wires to normal position.

3. A data storage and read-out mechanism comprising, a plurality of wires, means for supporting said wires in spaced radial relation to each other in a common circumferential plane, means rotatably mounted for angular movement over said wires and adapted to displace selected wires from said common plane, means rotatably mounted for angular movement over said wires for detecting displaced wires, and means operative to restore displaced wires to said common plane.

4. A data storage and read-out mechanism comprising, a plurality of wires, means for supporting said wires in spaced radial relation to each other in a common circumferential plane, electromagnetic means rotatably mounted for angular movement over said wires and adapted to displace selected wires from said common plane, means rotatably mounted for angular movement over said wires for detecting displaced wires, and means operative to restore displaced wires to said common plane.

5. A data storage and read-out mechanism comprising, a plurality of wires, means for supporting said wires in spaced radial relation to each other in a common circumferential plane, electromagnetic means rotatably mounted for angular movement over said wires and adapted to displace selected wires from said common plane, electromagnetic means rotatably mounted for angular movement over said wires for detecting displaced wires, and means operative to restore displaced wires to said common plane.

6. A data storage and read-out mechanism comprising, a plurality of wires, means for supporting said wires in spaced radial relation to each other in a common circumferential plane, electromagnetic means rotatably mounted for angular movement over said wires and adapted to displace selected wires from said common plane, electric switch means rotatably mounted for angular movement over said wires and into switch closing contact with displaced wires, and means operative to restore displaced wires to said common plane.

7. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted for movement in unison over each group of said wires, means responsive to separate data sources for energizing said electromagnetic means to condition the same to magnetically displace selected wires from normal position to represent values, means mounted for movement over said wires for detecting displaced wires, and means operative for restoring displaced wires to normal position.

8. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted for movement in unison over each group of said wires, means responsive to separate data sources for energizing said electromagnetic means to condition the same to magnetically displace selected wires from normal position to represent values, separate means mounted for movement in unison over each group of said wires for detecting displaced wires, and means operative for restoring displaced wires to normal position.

9. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted for movement in unison over each group of said wires, means responsive to separate data sources for energizing said electromagnetic means to condition the same to magnetically displace selected wires from normal position, separate electric switch devices mounted for movement in unison over each group of said wires and into switch closing contact with displaced wires, and means operative for restoring displaced wires to normal position.

10. A data storage and read-out mechanism comprising, a plurality of wires constituting separate operative groups thereof wherein the same relative wire of each group is representative of the same value, means for supporting said wires in spaced relation to each other and in a single common plane, separate means mounted for movement in unison over each group of said wires and adapted to displace selected wires from normal position to represent values, a pair of devices mounted in fixed relationship to each other for movement in unison over oppositely disposed operative groups of said wires for detecting displaced wires, and means controlled by said pair of devices for comparing the relative value of displaced wires in oppositely disposed groups of said wires.

11. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted for movement in unison over each group of said wires, means responsive to a pair of data sources for energizing said electromagnetic means to condition the same to magnetically displace selected wires from normal position to represent values in said separate operative groups, a pair of electromagnetic devices mounted in fixed relationship to each other for movement in unison over oppositely disposed groups of said wires for detecting displaced wires, and means controlled by said pair of electromagnetic devices for comparing the relative value of displaced wires in oppositely disposed groups of said wires.

12. A data storage and read-out mechanism comprising, a plurality of wires constituting separate operative groups thereof wherein the same relative wire of each group is representative of the same value, means for supporting said wires in spaced radial relation to each other in a common circumferential plane, separate means rotatably mounted for angular movement over each group of said wires and adapted to displace selected wires from said common plane to represent values, means rotatably mounted for angular movement over said wires for detecting displaced wires, and means operative to restore displaced wires to said common plane.

13. A data storage and read-out mechanism comprising, a plurality of wires constituting separate operative groups thereof wherein the same relative wire of each group is representative of the same value, means for supporting said wires in spaced radial relation to each other in a common circumferential plane, separate means rotatably mounted for angular movement over each group of said wires and adapted to displace selected wires from said common plane to represent values, separate means rotatably mounted for angular movement over each group of said wires for detecting displaced wires, and means operative to restore displaced wires to said common plane.

14. A data storage and read-out mechanism comprising, a plurality of wires constituting separate operative groups thereof wherein the same relative wire of each group is representative of the same value, means for supporting said wires in spaced radial relation to each other in a common circumferential plane, separate electromagnetic means rotatably mounted for angular movement over each group of said wires and adapted to displace selected wires from said common plane to represent values, separate electric switch devices rotatably mounted for angular movement over each group of said wires and into switch closing contact with displaced wires, and means operative to restore displaced wires to said common plane.

15. A data storage and read-out mechanism comprising, a plurality of wires constituting separate operative groups thereof wherein the same relative wire of each group is representative of the same value, means for supporting said wires in spaced radial relation to each other in a common circumferential plane, separate means rotatably mounted for angular movement over each group of said wires and adapted to displace selected wires from said common plane to represent values, a pair of devices rotatably mounted for angular movement over oppositely disposed groups of said wires for detecting displaced wires, and means controlled by said pair of devices for comparing the relative value of displaced wires in oppositely disposed groups of said wires.

16. A data storage and read-out mechanism comprising, a plurality of wires constituting separate operative groups thereof wherein the same relative wire of each group is representative of the same value, means for supporting said wires in spaced radial relation to each other in a common circumferential plane, separate electromagnetic means rotatably mounted for angular movement over each group of said wires and adapted to displace selected wires from said common plane to represent values, a pair of electromagnetic devices rotatably mounted for angular movement over oppositely disposed groups of said wires for detecting displaced wires, and means controlled by said pair of electromagnetic devices for comparing the relative value of displaced wires in oppositely disposed groups of said wires.

17. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted in fixed relationship to each other for movement in unison over each group of said wires and adapted when energized to magnetically displace selected wires from normal position to represent values, means under control of a data source for energizing said electromagnetic means and render them effective to displace wires corresponding to the values in such data source, means for each group of said wires responsive to displaced wires mounted in fixed spaced relationship to each other for movement in unison over said wires for detecting displaced wires, and means operative for restoring displaced wires to normal position.

18. A data storage and read-out mechanism comprising, a plurality of wires constituting separate operative groups thereof wherein the same relative wire of each group is representative of the same value, means for supporting said wires in spaced relation to each other and in a single common plane, separate electromagnetic means mounted in fixed relationship to each other for movement in unison over each group of said wires and adapted to magnetically displace selected wires from normal position to represent values, means under control of separate data sources for energizng electromagnetic wire displacing means in oppositely disposed groups of said wires to render them effective to displace wires corresponding to values in such separate data sources, a pair of electromagnetic devices mounted in fixed spaced relationship to each other for movement in unison over oppositely disposed groups of said wires for detecting displaced wires, and means controlled by said pair of electromagnetic devices for comparing the relative value of wires displaced in oppositely disposed groups of said wires under control of separate data sources.

19. A data storage and read-out mechanism comprising, a plurality of wires constituting separate operative groups thereof wherein the same relative wire of each group is representative of the same value, means for supporting said wires in spaced radial relation to each other in a common circumferential plane, separate means rotatably mounted for angular movement over each group of said wires and adapted to displace selected wires from said common plane to represent values, means under control of a data source for rendering said wire displacing means effective to displace wires corresponding to the values in such data source, means rotatably mounted for angular movement over said wires for detecting displaced wires, and means operative to restore displaced wires to said common plane.

20. A data storage and read-out mechanism comprising, a plurality of wires constituting separate operative groups thereof wherein the same relative wire of each group is representative of the same value, means for supporting said wires in spaced radial relation to each other in a common circumferential plane, separate electromagnetic means rotatably mounted for angular movement over each group of said wires and adapted when energized to displace selected wires from said common plane to represent values, means under control of a data source for energizing said electromagnetic means and render them effective to displace wires corresponding to the values in such data source, means rotatably mounted for angular movement over said wires for detecting displaced wires, and means operative to restore displaced wires to said common plane.

21. A data storage and read-out mechanism comprising, a plurality of wires constituting separate operative groups thereof wherein the same relative wire of each group is representative of the same value, means for supporting said wires in spaced radial relation to each other in a common circumferential plane, separate electromagnetic means rotatably mounted for angular movement over each group of said wires and adapted to displace selected wires from said common plane to represent values, means under control of separate data sources for energizing electromagnetic wire displacing means in oppositely disposed groups of said wires to render them effective to displace wires corresponding to values in such separate data sources, a pair of electromagnetic devices rotatably mounted for angular movement over oppositely disposed groups of said wires for detecting displaced wires, means controlled by said pair of electromagnetic devices for comparing the relative value of wires displaced in oppositely disposed groups of said wires under control of separate data sources, and means operative to restore displaced wires to said common plane.

HANS P. LUHN.

References Cited in the file of this patent

FOREIGN PATENTS

| Number | Country | Date |
|---|---|---|
| 622,650 | Great Britain | May 5, 1949 |